April 21, 1925.
J. W. SHERMAN
1,534,469
COMBINED EMERGENCY BRAKE AND CLUTCH RELEASE
Filed April 1, 1924
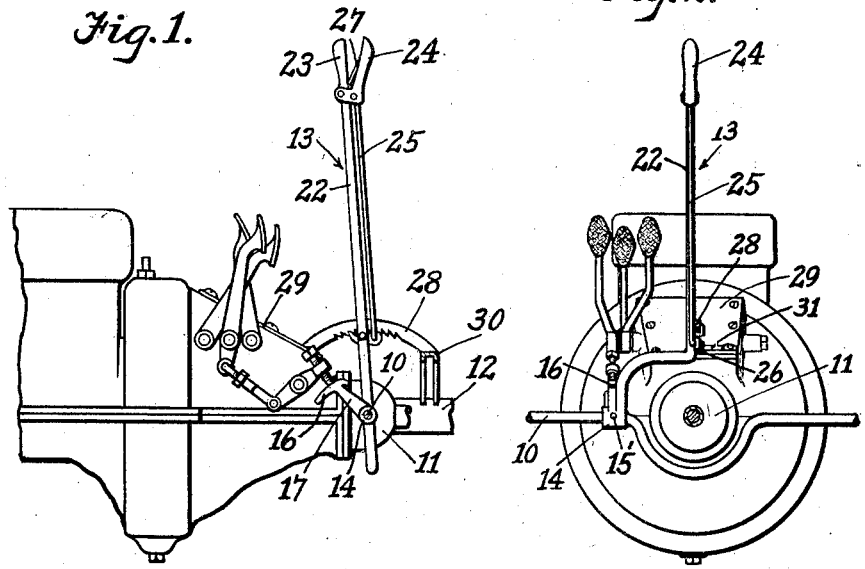
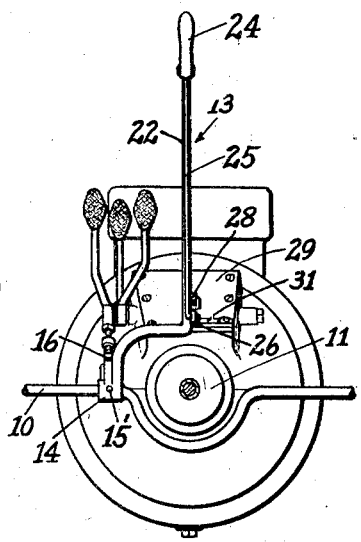
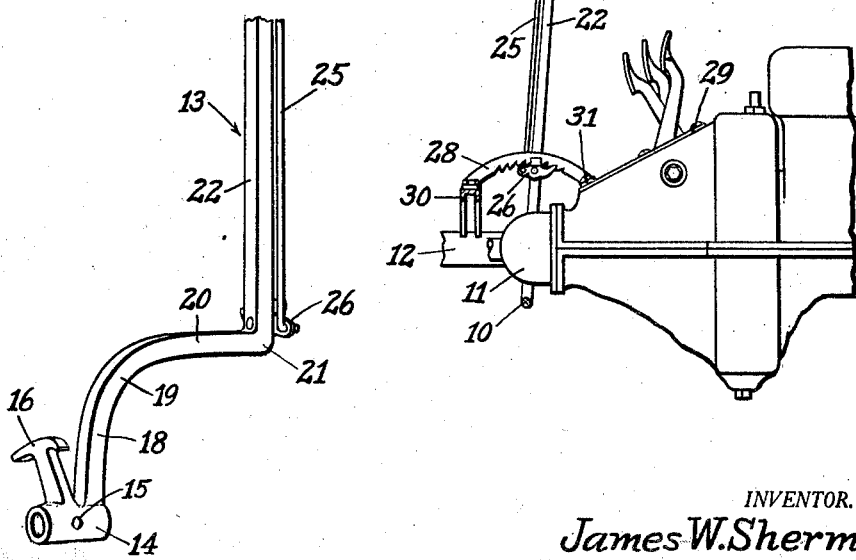
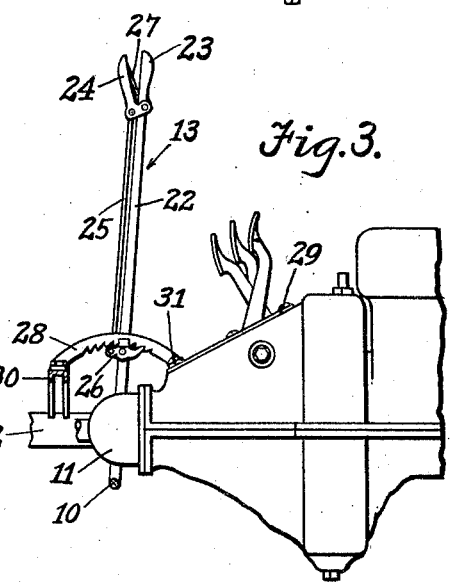
INVENTOR.
James W. Sherman
BY
ATTORNEY.

Patented Apr. 21, 1925.

1,534,469

UNITED STATES PATENT OFFICE.

JAMES W. SHERMAN, OF HUNTINGTON PARK, CALIFORNIA.

COMBINED EMERGENCY BRAKE AND CLUTCH RELEASE.

Application filed April 1, 1924. Serial No. 703,331.

*To all whom it may concern:*

Be it known that I, JAMES W. SHERMAN, a citizen of the United States, residing at Huntington Park, in the county of Los Angeles and State of California, have invented new and useful Improvements in Combined Emergency Brakes and Clutch Releases, of which the following is a specification.

My invention relates to improvements in emergency brakes and particularly to improvements in brake levers for a combined emergency brake and clutch release of the type used on Ford automobiles.

The position of the emergency brake lever in automobiles of the Ford type, as at present constructed, namely on the left side, is such as to seriously obstruct entrance through the left, front door of the machine. Furthermore, in its present position on the left of the driver, the lever cannot be operated conveniently by the right hand, as is desirable for most drivers.

The main object of my invention, therefore, is to provide an emergency brake and clutch release lever, for use on automobiles of the Ford type, which will not obstruct entry at the left side of the machine.

Another object is to provide a lever of the type described which will be in a convenient position for operation by the right hand of the driver.

Other objects and advantages will appear hereinafter and while I show herewith and will describe a preferred form of construction, I desire to be understood that I do not limit my invention to such preferred form but that various changes and adaptations may be made therein without departing from the spirit of my invention as hereinafter claimed.

My invention is illustrated in the accompanying drawings, in which Fig. 1 is a left side view, in elevation, of the rear portion of a Ford automobile engine having my improved brake lever mounted upon the usual control shaft used therewith.

Fig. 2 is a rear view of the brake lever and associated parts shown in Fig. 1.

Fig. 3 is a right side view of the brake lever and associated parts, corresponding to that shown in Fig. 1.

Fig. 4 is a fragmentary view in perspective of the lower end of my improved brake lever showing more clearly its essential parts.

Referring to the drawings in detail, as indicated by the numerals, the controller shaft 10 is of the usual form, having a downwardly curved central portion to clear the universal joint casing 11 of the drive shaft and having its ends journaled in brackets (not shown) attached to the side bars 12 of the automobile framework.

My emergency brake lever 13 has a sleeve 14 on its lower end adapted to fit on the controller shaft, this sleeve being provided with diametrically opposite holes 15 to receive a pin 15', which extends through the shaft and holds the sleeve and the lever fixed thereon. The usual clutch releasing cam 16 is supported on an arm 17 which is made integral with sleeve 14. It is, therefore, rigidly fixed with lever 13, on the controller shaft. Lever 13 has a short radial extension 18 from sleeve 14, a curved portion 19, a lateral extension 20, a right angled bend 21 and a long radial extension 22 terminating in a handle 23. The usual grip lever 24 with connecting rod 25 and pawl 26 is pivoted on the long extension of the lever in the usual way. A spring 27 serves to hold the grip lever in its open position.

An arcuate ratchet 28 adapted to engage with pawl 26 has its forward end resting on the transmission case cover 29 and its rear end fixed to a cross bar 30, having its ends secured to side bars 12. The forward end of the ratchet piece has a lateral extension 31 through which one of the fastening screws of cover 29 extends, thus holding the ratchet securely in place.

As shown in Fig. 2 the formation of the lower end of the brake lever is such as to bring its upper extension with the grip lever in a central position as to the car body and the driver's seat. In this central position the lever does not obstruct entrance from either side of the vehicle, and it has the additional advantage of being readily operable by the right hand of the driver.

The operation of my brake lever is the same as that of present brake levers of this type and produces the same results, namely, applies the emergency brake and, simultaneously, through the action of cam 16 on the clutch lever 32, releases the clutch.

I claim as my invention:

1. A combination brake lever and clutch release cam adapted for use with emergency brakes of the Ford type, said lever and cam having a common mounting sleeve and the handle of said lever being offset from said mounting sleeve so as to assume a transversely central position in the automobile, and means secured to said lever, to the transmission cover and to the side bars of the automobile for holding said lever and cam in any desired position.

2. In combination with an emergency brake of the Ford type, a brake lever and a clutch release cam having a common mounting sleeve adapted for mounting on the controller shaft, said lever having a short radial extension from the mounting sleeve, a right angled bend, a lateral extension toward the transverse center of the automobile, a second right angled bend and a relatively long radial extension terminating in a handle, a grip lever and a pawl pivotally mounted on said long radial extension and connected by a rod, and a ratchet with which said pawl engages to hold the lever handle in any desired position said ratchet being fixed to the transmission cover and to the framework of the automobile under the body thereof.

JAMES W. SHERMAN.